US008325735B2

(12) United States Patent
Khawer et al.

(10) Patent No.: US 8,325,735 B2
(45) Date of Patent: Dec. 4, 2012

(54) MULTI-LINK LOAD BALANCING FOR REVERSE LINK BACKHAUL TRANSMISSION

(75) Inventors: Mohammad Riaz Khawer, Lake Hopatcong, NJ (US); Mark H. Kraml, Flanders, NJ (US); Stephen George Pisano, Keswick, VA (US); Tomas S. Yang, Parsippany, NJ (US)

(73) Assignee: Alcatel Lucent, Paris (FR)

( * ) Notice: Subject to any disclaimer, the term of this patent is extended or adjusted under 35 U.S.C. 154(b) by 901 days.

(21) Appl. No.: 11/819,620

(22) Filed: Jun. 28, 2007

(65) Prior Publication Data

US 2009/0003271 A1    Jan. 1, 2009

(51) Int. Cl.
*H04L 12/56* (2006.01)

(52) U.S. Cl. .................. 370/395.42; 370/413; 370/415; 370/417; 370/444

(58) Field of Classification Search ............... 370/395.2, 370/395.21, 395.3, 395.31, 395.32, 395.4, 370/395.41, 395.42, 395.43
See application file for complete search history.

(56) References Cited

U.S. PATENT DOCUMENTS

| 5,828,899 | A  | * | 10/1998 | Richard et al. ................ 710/8 |
| 6,980,533 | B1 | * | 12/2005 | Abraham et al. ............. 370/329 |
| 2003/0112829 | A1 | * | 6/2003 | Sridhar ........................ 370/522 |
| 2003/0133457 | A1 | * | 7/2003 | Ono et al. .................. 370/395.4 |
| 2004/0213152 | A1 | * | 10/2004 | Matuoka et al. ............. 370/230 |
| 2006/0104231 | A1 | * | 5/2006 | Gidwani ....................... 370/328 |
| 2006/0120374 | A1 | * | 6/2006 | Yoshimoto et al. .......... 370/392 |
| 2007/0041375 | A1 | * | 2/2007 | Bordonaro et al. .......... 370/389 |

* cited by examiner

*Primary Examiner* — Bo Hui A Zhu
(74) *Attorney, Agent, or Firm* — Harness, Dickey & Pierce, P.L.C.

(57) ABSTRACT

One embodiment includes distributing user traffic packets to a plurality of queues, and draining the queues of the user traffic packets according to a defined methodology. The drained user traffic packets are sent to a plurality of physical channel interfaces. Each of the plurality of physical channel interfaces interfaces with a respective channel of the backhaul. The sending step sends each of the drained user traffic packets to the physical channel.

18 Claims, 10 Drawing Sheets

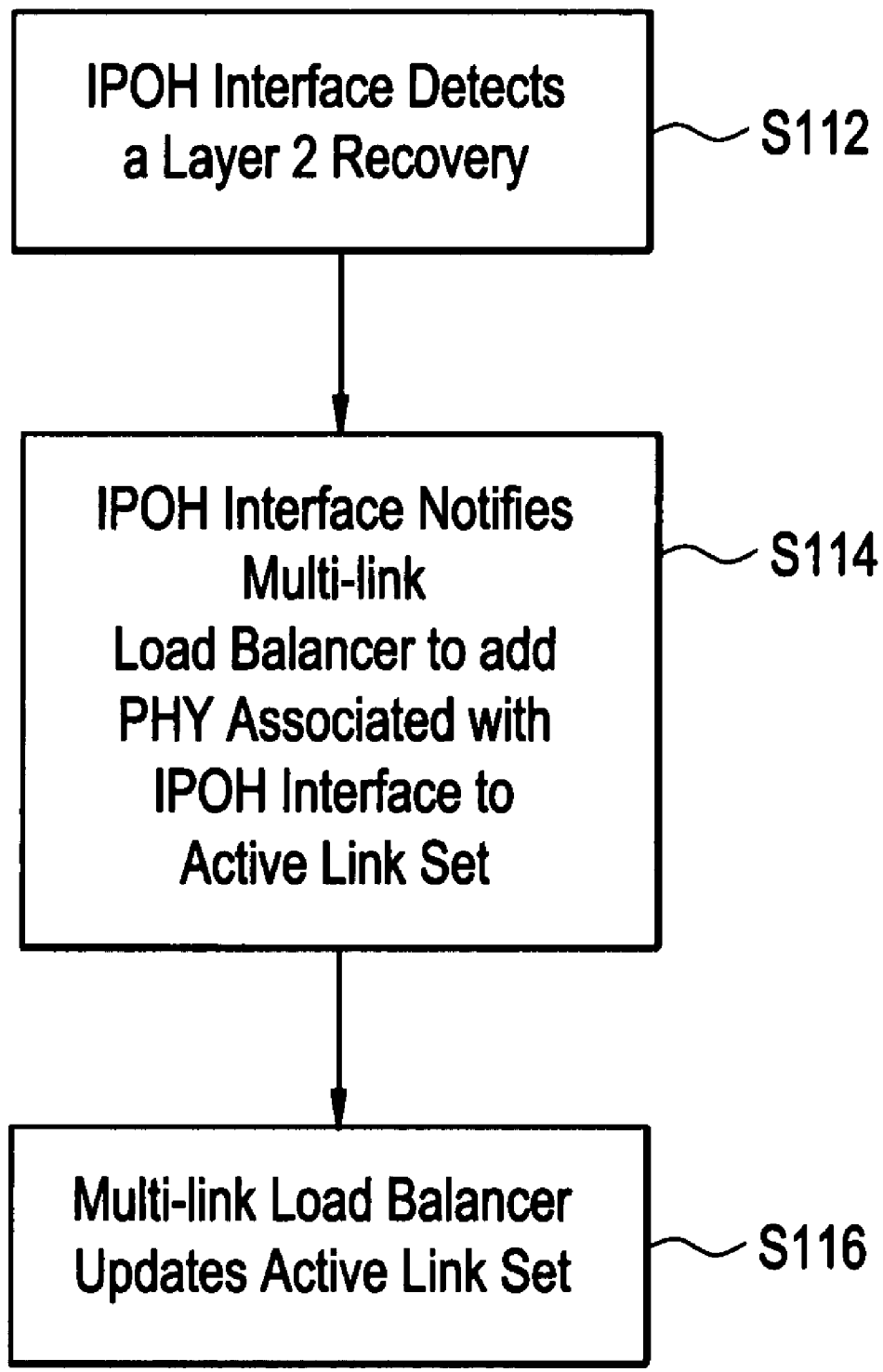

MULTI-LINK LOAD BALANCING FOR REVERSE LINK BACKHAUL TRANSMISSION

BACKGROUND OF THE INVENTION

1. Field of the Invention

Example embodiments of the present invention relate generally to load balancing transmission over a backhaul on the reverse link of a wireless communications network.

2. Description of the Related Art

FIG. 1 illustrates a general architecture of a well-known wireless communication network. In particular, FIG. 1 illustrates a portion of an EVDO wireless network. As shown, an access terminal (AT) 10 communicates with a base transceiver station (BTS) 12 over an air interface. Examples of an AT include a mobile station, a mobile unit, a wireless phone, wireless equipped PDA or computer, etc. Multiple base transceiver stations 12 communicate with a radio network controller (RNC) 14, which provides signaling and traffic processing for each wireless data session. The AT 10, BTS 12, RNC 14, and the interfaces between these components form what is known as a radio access network (RAN). The RAN communicates with a core network to access, for example, the internet. In the example of FIG. 1, the core network includes one or more packet data service nodes (PDSNs) 16 connected between the RNCs 14 and, for example, the internet (not shown).

The interface 18 between the BTS 12 and the RNC 14 is often called the backhaul. In particular, the interface 18 typically includes multiple T1/E1 lines connected between the BTS 12 and the RNC 14 for carrying packet data (e.g., IP packet data) between the BTS 12 and the RNC 14. Packet data flowing from the BTS 12 to the RNC 14 is said to flow over the reverse link, and packet data flowing from the RNC 14 to the BTS 12 is said to flow over the forward link.

FIG. 2 illustrates a portion of a conventional BTS. As shown, the BTS includes an IP stack 122, a plurality of IP over high data layer control (IPOH) interfaces 124, a plurality of physical channel interfaces (PHYs) 126, a management plane entity (MPE) 128, and an error detector 130. The MPE 128, the IPOH interfaces 124 and the IP stack 122 are logical elements implemented in processor of the BTS. The PHYs 126 are hardware interfaces, which each interface with a respective one of the T1/E1 lines. In EVDO, the physical channel interface is a TDMA PHY.

The MPE 128 configures each IPOH interface 124—protocols run at the IPOH interface 124, etc. As part of the configuration, each IPOH interface 124 obtains an associated IP address. Each IPOH interface 124 is associated with a respective one of the PHYs 126, and configures the associated PHY 126. For example, the IPOH interface 124 configures the layer 2 protocol used by the associated PHY 126. For example, the PHYs 126 may be configured to use the high data layer control (HDLC) protocol at layer 2.

Packets destined to the RNC 14 are received at an IP stack 122. The received packets may be data packets received by the BTS 12 from the AT 10. These packets are often referred to as user traffic packets. The received packets may also be data packets generated by the BTS 12 for control/management/signaling purposes. These packets are often referred to as interface packets. For example, a ping may be a form of interface packet. The interface packets will include a destination IP address that matches the IP address for one of the IPOH interfaces 124. By contrast, the user traffic packets do not have IP addresses matching an IP address of the IPOH interfaces 124.

During operation, the IP stack 122 examines header information in the IP packet to determine the IP address. If the IP address matches one of the IPOH interfaces 124, the packet is an interface packet and is sent to that IPOH interface 124. The IPOH interface 124 then sends the interface packet to the associated PHY 126.

If the IP address does not match the IP address for one of the IPOH interfaces 124, the packet is a user traffic packet. In configuring the IPOH interfaces 124, the MPE 128 establishes a default route from the IP stack 122 to one of the IPOH interfaces 124 for packets having IP addresses that do not match the IP addresses of the IPOH interfaces 124. Accordingly, user traffic packets are directed to a same IPOH interface 124. Consequently, the traffic packets for users are sent on the reverse link over a same single PHY 126. Unfortunately, it is expected that wireless communication systems will evolve to the point where a single T1/E1 can not handle a single user's reverse link traffic.

As mentioned above, the BTS 12 also includes an error detector 130 that detects physical layer problems. Numerous well-known techniques exist for detecting physical layer problems (e.g., a break in a T1/E1 line). The error detector 130 reports detected errors to the MPE 128. Similarly, the IPOH interfaces 124 detect layer 2 problems, and may report a detected error to the MPE 128. The MPE 128 disables the IPOH interface 124 associated a physical layer problem from communicating packets to the associated PHY 126, and therefore, the PHY 126 associated with the disabled IPOH interface 124 is disabled from communicating packets as well. An IPOH interface 124 detecting a layer 2 problem also disables communication of further packets. If a disabled IPOH interface 124 is the default route IPOH interface 124, the MPE 128 reconfigures the default route to a different IPOH interface 124. Upon recovery from the physical layer or layer 2 problem, the IPOH interface 124 may be re-enabled to communicate packets to the PHY 126.

SUMMARY OF THE INVENTION

The present invention relates to a method of configuring a base station entity to load balance a backhaul on a reverse link.

In one embodiment, the method includes configuring a load balancer in the base station entity, and configuring at least one packet control interface in the base station entity. The load balancer is configured to include a number of queues and a link scheduler. The link scheduler is configured to drain packets from the queues and output the drained packets to a plurality of physical channel interfaces. Each of the plurality of physical channel interfaces interfaces with a respective channel of the backhaul. The packet control interface is configured to receive packets for transmission over the backhaul and for storing the received packet in one of the queues of the load balancer.

The present invention further relates to a method of load balancing transmission from a base station entity over a backhaul on the reverse link.

One embodiment includes distributing user traffic packets to a plurality of queues, and draining the queues of the user traffic packets according to a defined methodology. The drained user traffic packets are sent to a plurality of physical channel interfaces. Each of the plurality of physical channel interfaces interfaces with a respective channel of the backhaul. The sending step sends each of the drained user traffic packets to the physical channel interface associated with a least loaded channel of the backhaul.

BRIEF DESCRIPTION OF THE DRAWINGS

The present invention will become more fully understood from the detail description given herein below and the accompanying drawings which are given by way of illustration only, wherein like reference numerals designate corresponding parts in the various drawings, and wherein:

FIG. 11 illustrates a flow chart of a method for managing recovery from layer 2 problems in the BTS of FIG. 3.

DETAILED DESCRIPTION OF EXAMPLE EMBODIMENTS

Figure 1:
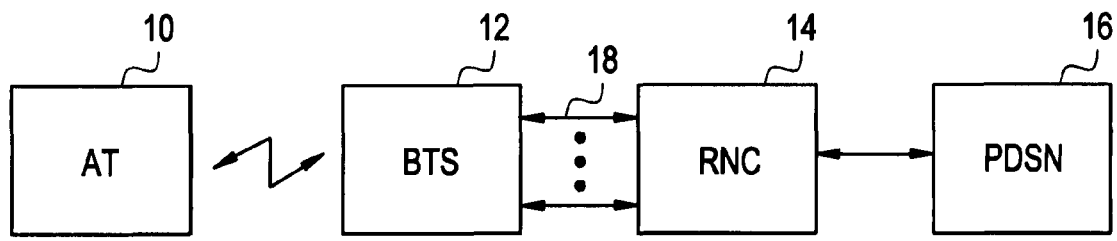
FIG. 1 illustrates a general architecture of a well-known wireless communication network.

Example embodiments will now be described more fully with reference to the accompanying drawings. However, example embodiments may be embodied in many different forms and should not be construed as being limited to the example embodiments set forth herein. Example embodiments are provided so that this disclosure will be thorough, and will fully convey the scope to those who are skilled in the art. In some example embodiments, well-known processes, well-known device structures, and well-known technologies are not described in detail to avoid the unclear interpretation of the example embodiments. Throughout the specification, like reference numerals in the drawings denote like elements.

It will be understood that when an element or layer is referred to as being "on", "connected to" or "coupled to" another element or layer, it may be directly on, connected or coupled to the other element or layer, or intervening elements or layers may be present. In contrast, when an element is referred to as being "directly on" "directly connected to" or "directly coupled to" another element or layer, there may be no intervening elements or layers present. As used therein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Thus, a first element, component, region, layer or section discussed below could be termed a second element, component, region, layer or section without departing from the teachings of the example embodiments.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting. As used herein, the singular forms "a", "an" and "the" may be intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 3:
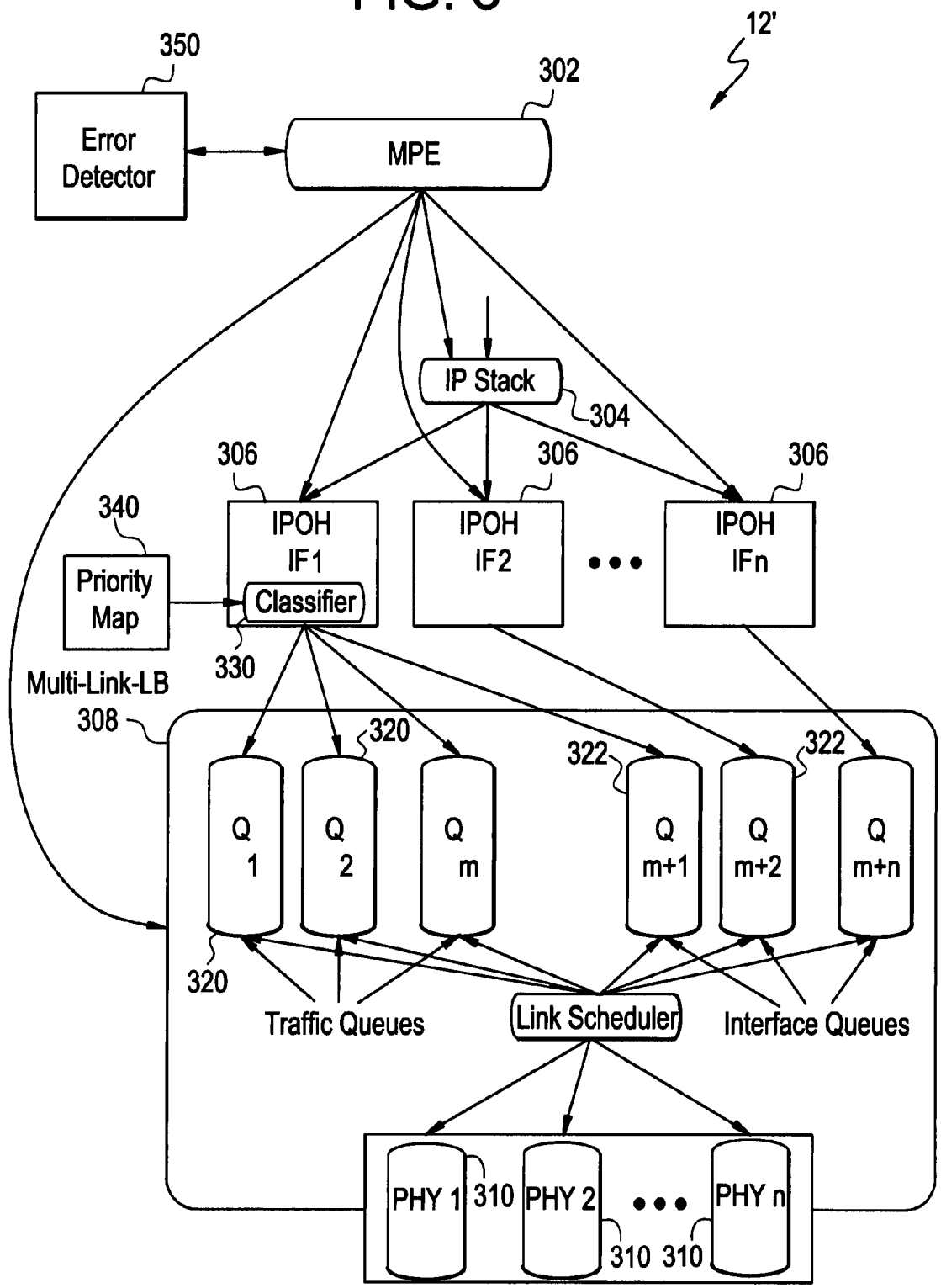
FIG. 3 illustrates a portion of a base transceiver station according to an embodiment of the present invention.

FIG. 3 illustrates a portion of a base transceiver station (BTS) according to an embodiment of the present invention. The BTS 12' of FIG. 3 may, for example, replace one or more BTSs 12 in the wireless communication system of FIG. 1. As shown, the BTS 12' may include an IP stack 304, one or more IPOH interfaces 306, a multi-link load balancer (ML-LB) 308, and a plurality of physical channel interfaces (PHY) 310.

As shown, packets destined to the RNC 14 are received at the IP stack 304. The received packets may be data packets received by the BTS 12' from the AT 10 or users. These packets are often referred to as user traffic packets. The received packets may also be data packets generated by the BTS 12' for control/management/signaling purposes. These packets are often referred to as interface packets. For example, a ping may be a form of interface packet.

For each T1/E1 line, the BTS 12' includes an associated physical channel interface (PHY) 310. In EVDO, the physical channel interface is a TDMA PHY. As will be described in greater detail below with respect to FIGS. 4-5, during operation, a management plane entity (MPE) 302 configures an IPOH interface 306 for each active PHY 310, the IPOH interfaces 306 configure their respective PHYs 310.

During operation, an IPOH interface 306 receives the interface packets for the associated PHY 310 from the IP stack 304, and sends those interface packets to the associated PHY 310. The MPE 302 controls the IPOH interfaces 306 and IP stack 304 such that the traffic packets for all users in the IP stack 304 are directed to only one of the IPOH interfaces 306, referred to as the primary IPOH interface 306. This is represented in FIG. 3 as the default route and will be described in greater detail below.

The MPE 302 also configures a multi-link load-balancer (ML-LB) 308 to interface between the IPOH interfaces 306 and the PHY 310. The ML-LB 308 queues the traffic and interface packets, and schedules the queued packets for transmission over the PHYs 310. In particular, the ML-LB 308 sends the interface packets over the associated PHY 310, but sends the user traffic packets over any one of the PHY 310 based on load balancing criteria. These processes will be described in greater detail below.

As shown in FIG. 3, the ML-LB 308 includes a number of traffic queues 320 and a number of interface queues 322. The number of interface queues 322 is dependent on the number of PHY 310. The number of traffic queues 320 is based on the different quality of service (QoS) levels possible for user traffic packets. Stated another way, the traffic queues 320 correspond to different priority classes, and the different QoS levels may be mapped to a priority class. In doing so, it will be appreciated that more than one QoS level may be mapped to the same priority class. Each of the IPOH interfaces 306 may include a classifier 330; however, FIG. 2 only shows the primary IPOH interface 306 as configured to include a classifier 330 for the sake of clarity. The classifier 330 accesses, for example, a field in a traffic packet indicating what kind of QoS treatment the packet requires. The classifier 330 then has that indicator compared to a list of such indicators stored in a priority map 340. The priority map 340 maps QoS indicators to the traffic queues 320. The classifier 330 stores the traffic packet in the determined traffic queue 320. In this manner, the traffic packets may be mapped to the traffic queue of the appropriate priority class. These and other operations will be described in greater detail below.

As further shown in FIG. 3, a link scheduler 324 selectively outputs the packets in the queues 320, 322 on the PHYs 310. In particular, the MPE 302 configures the link scheduler 324 to employ a particular scheduling scheme in performing this function. This will be described in greater detail below.

Figure 2:
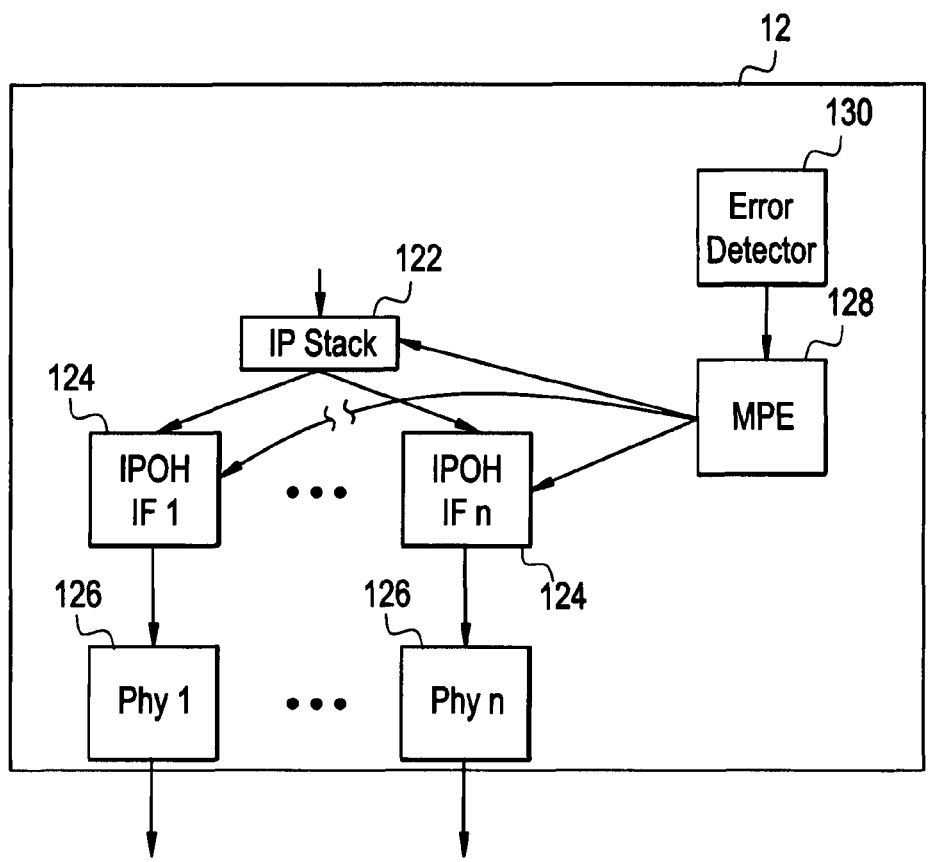
FIG. 2 illustrates a portion of a conventional base transceiver station.

Still further, the BTS 12' includes an error detector 350 for detecting physical channel errors in the same manner as described with respect to the prior art of FIG. 2.

Next operation of the BTS 12' according to embodiments of the present invention will be described in detail below.

Figure 4:
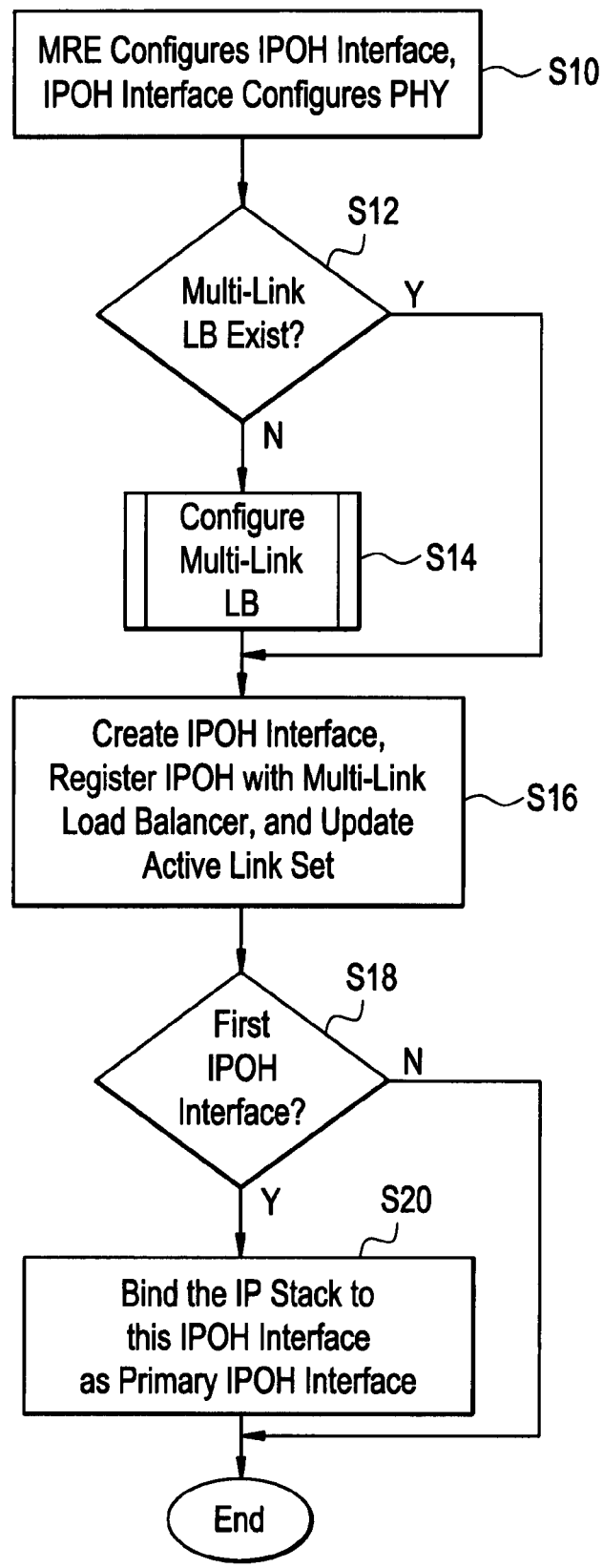
FIG. 4 illustrates a flow chart of the IPOH interface configuration operation according an embodiment of the present invention.

FIG. 4 illustrates a flow chart of an IPOH interface configuration operation according an embodiment of the present invention. The MPE 302 performs this operation for each active PHY 310. As shown, in step S10, the MPE 302 configures an IPOH interface 306 in association with the PHY 310. Namely, the MPE 302 creates the IPOH interface 306 associated with the PHY 310 for which this iteration of FIG. 4 is executed. The IPOH interface 306 is configured to have an IP address. As shown in FIG. 3, the IPOH interface 306 may also be configured to include a classifier 330, and the classifier 330 is configured to access the priority map 340. The IPOH interface 306 configures the associated PHY 310. For example, the IPOH interface 306 may configure the layer 2 protocol for the PHY 310. In one embodiment, the IPOH interface 306 may configure the PHY 310 to use the HDLC protocol at layer 2 in the well-known manner.

Figure 5:
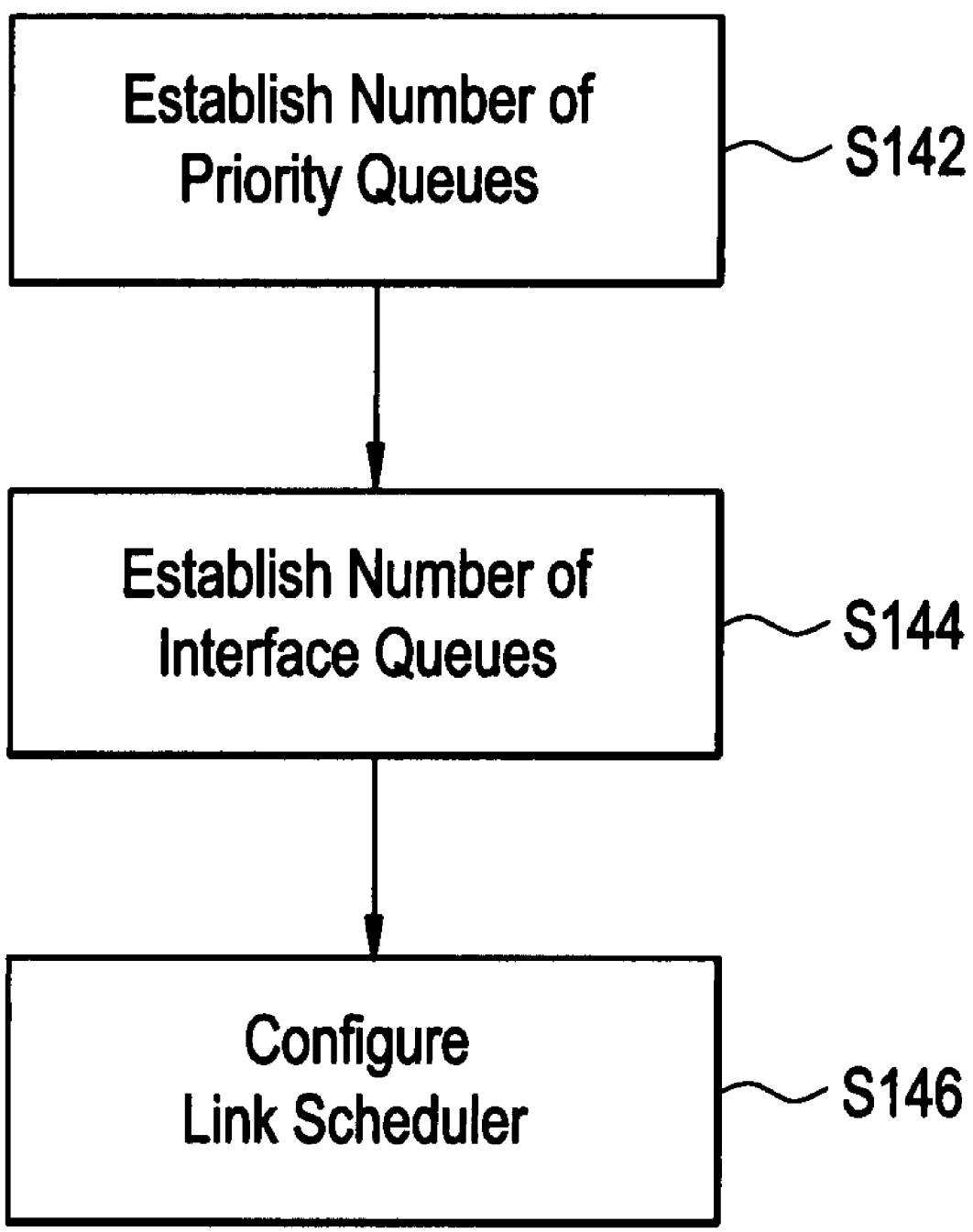
FIG. 5 illustrates the multi-link load balancer configuration step in FIG. 4 in greater detail.

The MPE 302 may then determine if the ML-LB 308 exists in step S12. If not, then in step S14 the MPE 302 configures the ML-LB 308. FIG. 5 illustrates the multi-link load balancer configuration step of FIG. 4 in greater detail. As shown, in step S142, the MPE 302 establishes the number of traffic queues 320. The number of traffic queues 320 established may be set equal to the number of priority classes, which may be based on the number of QoS level for the traffic packets. Next, in step S144, the MPE 302 establishes the number of interface queues 322. The number of interface queues 322 established may be set equal to the number of PHYs 310. Then, in step S146, the MPE 302 configures the link scheduler 324, and in particular, the scheduling policy employed by the link scheduler 324. The scheduling policy established may be any well-known scheduling methodology such as round robin, weighted round robin, etc. For example, in a weighted round robin scheme, three packets may be drained from the first traffic queue 320, two packets may be drained from the second traffic queue 320, etc.

Returning to FIG. 4, in step S16, the MPE 302 registers the IPOH interface 306 with the ML-LB 308 such that the IPOH interface 306 becomes associated with the interface queue 322 corresponding to the same associated PHY 310. Furthermore, the ML-LB 308 maintains of list (or set) of active PHY 310 called the active link set. Once the IPOH interface 306 is registered, the ML-LB 308 adds the associated PHY 310 to the active link set.

Next, the MPE 302 determines if the created IPOH interface 306 is the first created IPOH interface 306 in step S18. If so, then in step S20, the MPE 302 binds the IP stack to the IPOH interface 306 for traffic packets. Namely, a default path from the IP stack 304 to the first IPOH interface 306 is established. After step S18 the creation routine for an IPOH interface ends. This routine may be repeated for each PHY 310 to create an IPOH interface associated with each PHY 310. Also, in step S18, if the IPOH interface 306 created in step S10 is not the first IPOH interface, then the IPOH interface creation routine for this PHY 310 ends.

Figure 6:
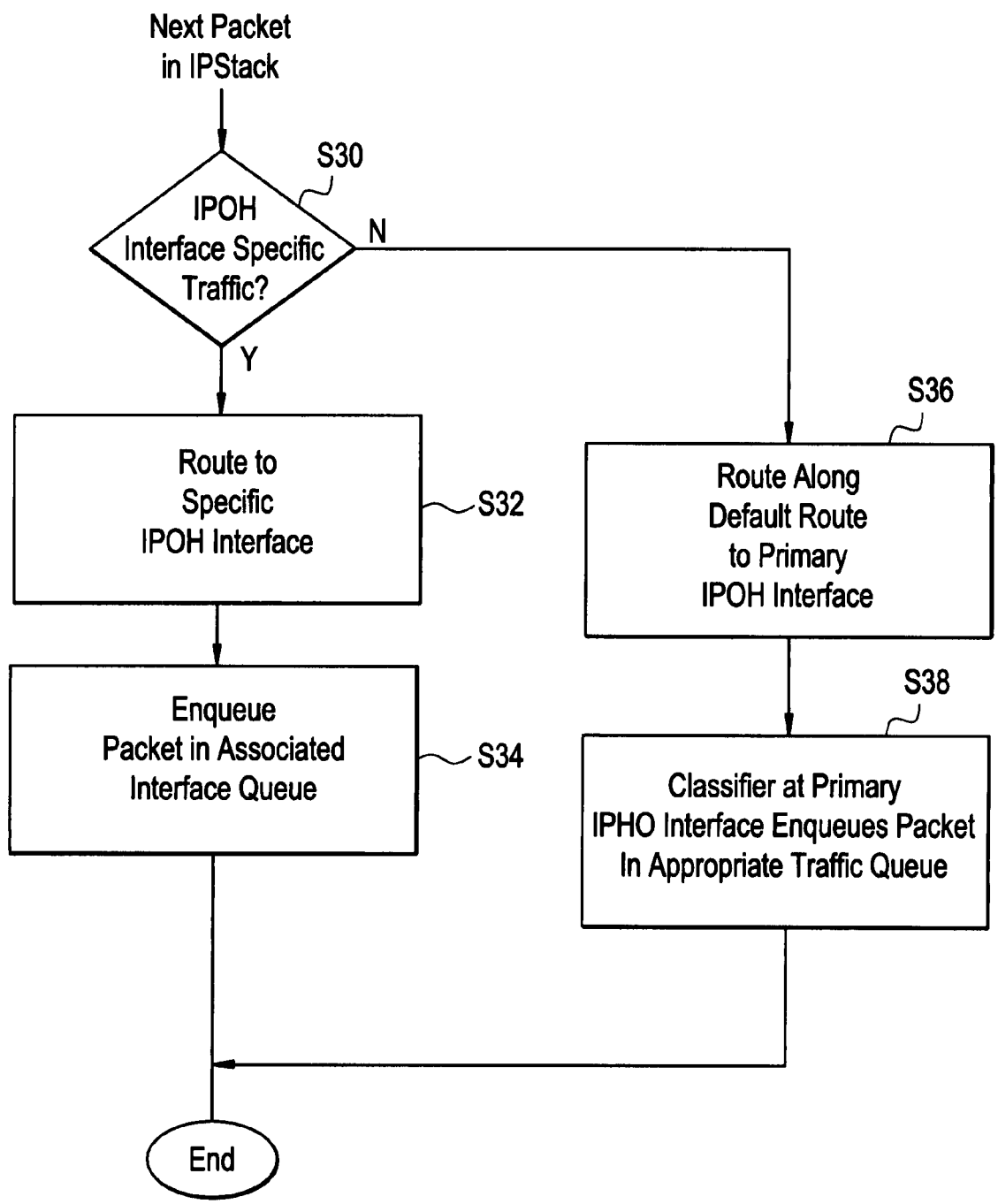
FIG. 6 illustrates an embodiment of a method for routing packets from the IP stack to the queues of the multi-link load balancer of the BTS in FIG. 3.

FIG. 6 illustrates an embodiment of a method for routing packets from the IP stack to the queues of the multi-link load balancer 308 of the BTS. As shown, the IP stack 304 determines in step S30 whether the next packet for routing to a queue of the ML-LB 308 is interface specific traffic. In particular, the IP stack 304 determines if the IP address of the packet matches an IP address for any of the IPOH interfaces 306. If so, the packet is an interface packet, and the IP stack 304 routes the interface packet to the IPOH interface 306 associated with the PHY 310 to which the interface packet is destined in step S32. Then, in step S34, the IPOH interface 306 enqueues the interface packet in the interface queue 322 associated with the same PHY 310 as the IPOH interface 306.

Figure 7:
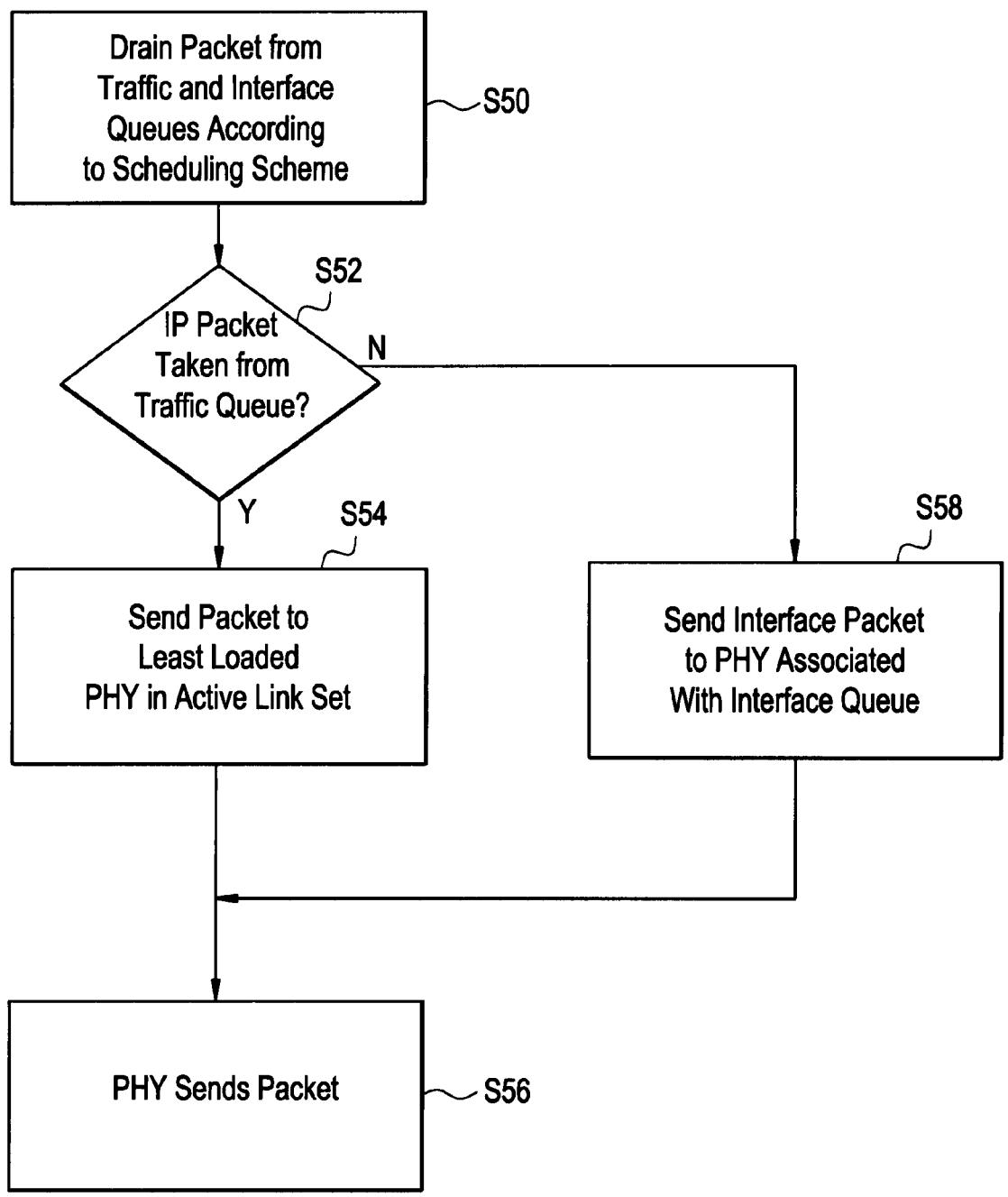
FIG. 7 illustrates an embodiment of a method for scheduling packets in the multi-link load balancer queues for transmission over the T1/E1 lines.

Returning to step S30, if the IP stack 304 determines that the next packet for routing to an IPOH interface 306 is not interface specific, then the packet is a user traffic packet. In particular, if the IP address of the packet does not match an IP address of any IPOH interface 306, the packet is a user traffic packet. And, the IP stack 304 routes the user traffic packet along the default path to the primary IPOH interface 306 in step S36. Then, in step S38, the classifier 330 accesses, for example, a field in a traffic packet indicating what kind of QoS treatment the packet requires. The classifier 330 then has that indicator compared to a list of such indicators stored in the priority map 340. The priority map 340 maps QoS indicators to the traffic queues 320. The classifier 330 stores the traffic packet in the determined traffic queue 320. In this manner, the traffic packets may be mapped to the traffic queue of the appropriate priority class. FIG. 7 illustrates an embodiment of a method for scheduling packets in the multi-link load balancer queues for transmission over the T1/E1 lines. As shown, in step S50, the link scheduler 324 drains the traffic and interface queues 320 and 322 according to the scheduling scheme with which the link scheduler 324 was configured. For example, if the scheduling scheme is a round robin scheme, the link scheduler 324 first drains a packet from the first traffic queue 320, then drains a packet from the second traffic queue 320, etc. until a packet is drained from the last traffic queue 320. Then, a packet is drained from the first interface queue 322, a packet is drained from the second interface queue 322, etc. until a packet is drained from the last interface queue 322. Then the draining process repeats. In a weighted round robin scheme, three packets may be drained from the first traffic queue 320, two packets may be drained from the second traffic queue 320, etc. Any weighting scheme may be employed; however, it is expected that high priority traffic queues 320 will have a weight greater than or equal to lower priority traffic queues 320.

For each drained packet, the link scheduler 324 determines in step S52 if the packet was taken from a traffic queue 320. If so, then in step S54, the link scheduler 324 sends the drained packet to the least loaded PHY 310 in the active link set. In this manner, the load on the PHYs 310 may be more balanced, and a higher per user throughput may be achieved. The PHY 310 receiving the drained packet sends the packet over the associated T1/E1 line in step S56.

Returning to step S52, if the packet is not taken from a traffic queue 320 (i.e., the packet is taken from an interface queue 322), then in step S58, the link scheduler 324 sends the interface packet to the PHY 310 associated with the interface queue 322 from which that packet was drained, and associated with the T1/E1 line for which the interface packet was destined. The PHY 310 receiving the drained packet sends the packet over the associated T1/E1 line in step S56.

Next, link management in view of detected problems with the physical layer and layer 2 will be described.

Figure 8:
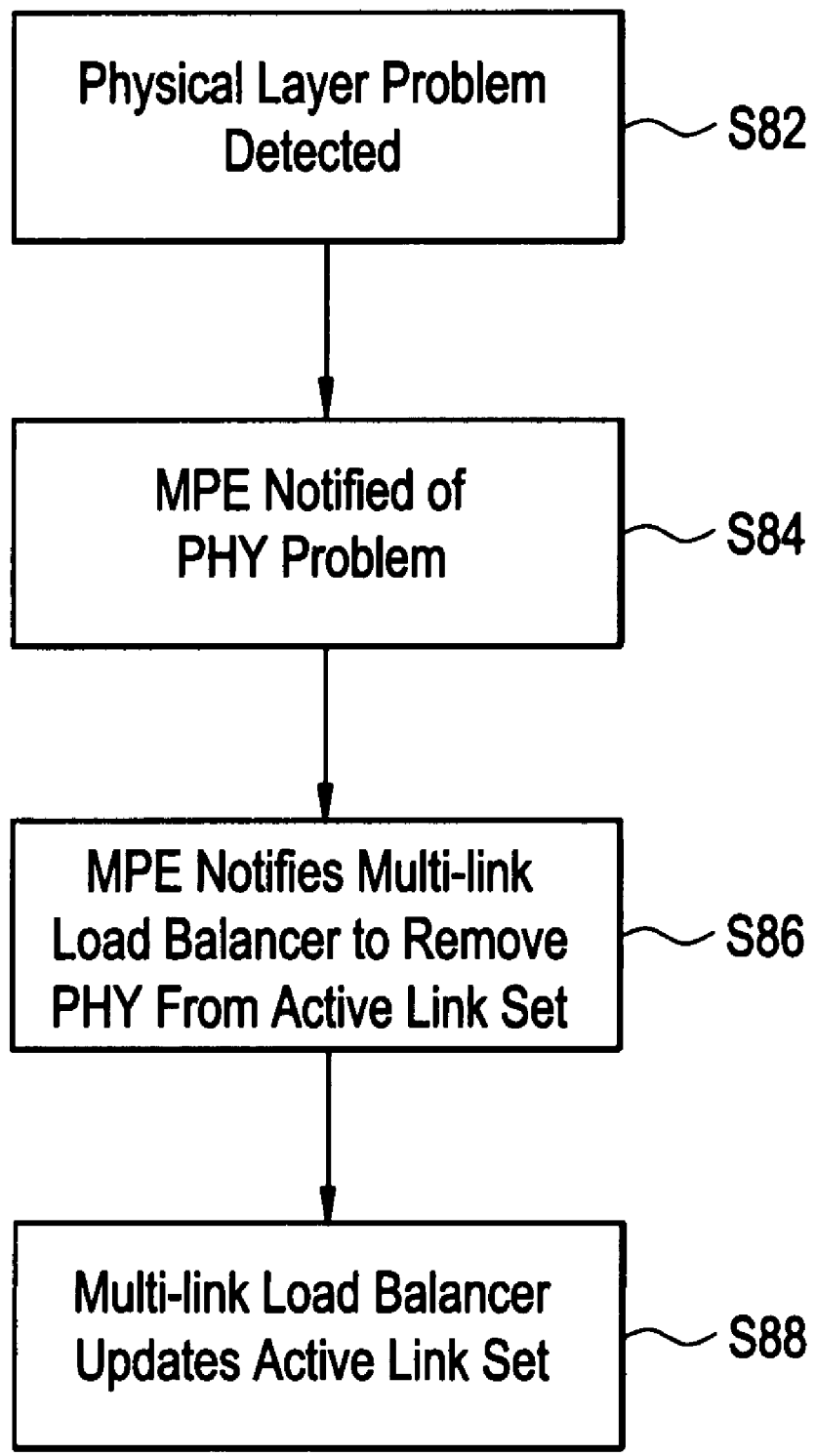
FIG. 8 illustrates a flow chart of a method for managing physical layer problems in the BTS of FIG. 3.

FIG. 8 illustrates a flow chart of a method for managing physical layer problems. As discussed above, the error detector 350 detects physical layer problems. For example, a break in a T1/E1 line may be detected. Many different well-known techniques exist for detecting physical layer errors, and any of these techniques may be used in conjunction with the present invention. For example, the error detector may be a well-known CSU device of the EVDO standard. Because these techniques are so well known, they will not be described in detail.

If a problem with the physical layer is detected in step S82, then in step S84, the MPE 302 is notified of the PHY 310 associated with the problem. The MPE 302 notifies the ML-LB 308 to remove the PHY 310 from the active link set in step S86, and in step S88, the ML-LB 308 removes the PHY 310 from the active link set. Accordingly, the ML-LB 308 will no longer schedule packets for transmission over the T1/E1 line associated with the removed PHY 310.

Figure 9:
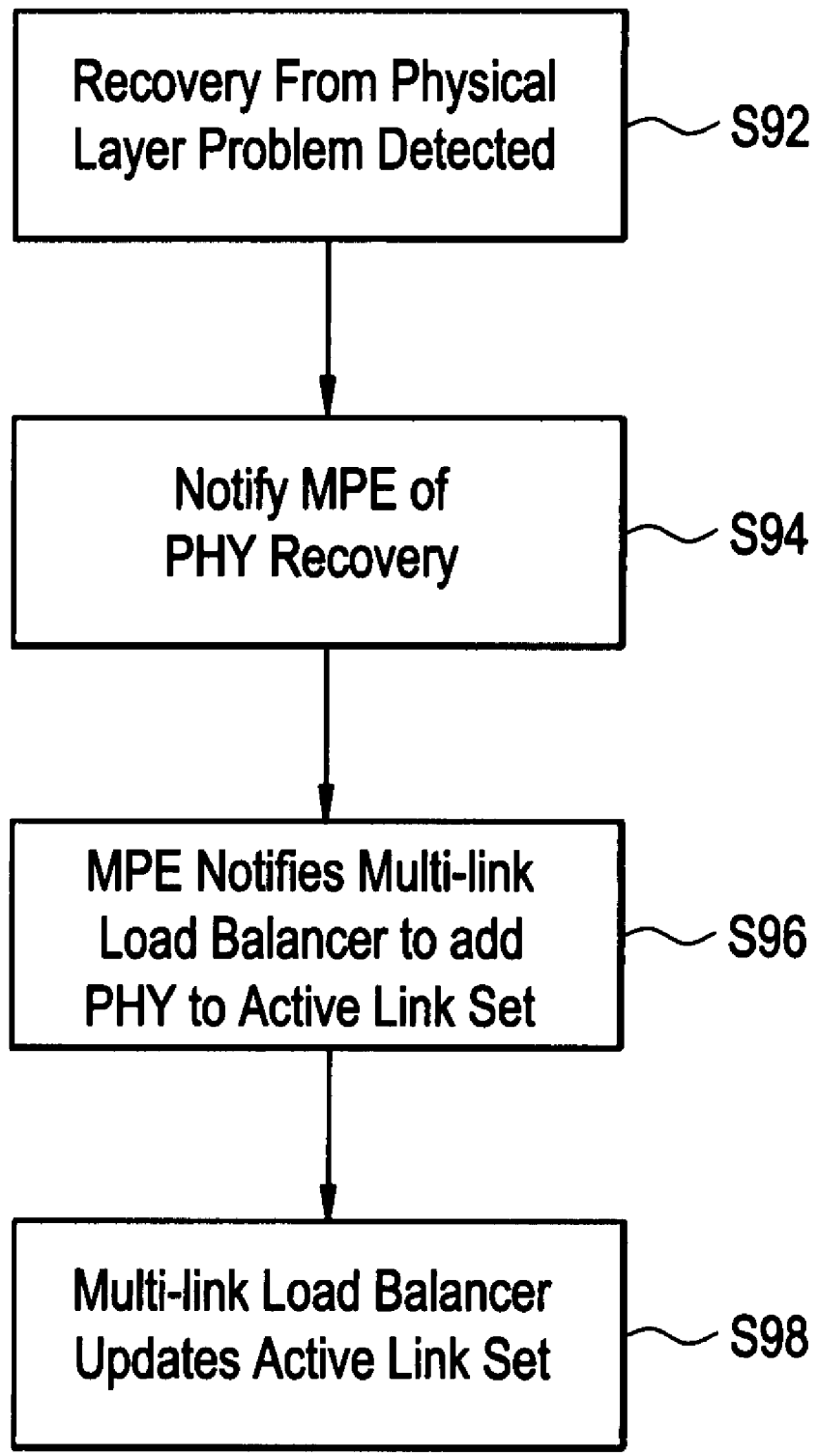
FIG. 9 illustrates a flow chart of a method for managing recovery from physical layer problems in the BTS of FIG. 3.

FIG. 9 illustrates a flow chart of a method for managing recovery from physical layer problems. As shown, in step S92, recovery from a physical layer problem is detected by the error detector 350. Many different well-known techniques exist for detecting recovery from physical layer errors, and any of these techniques may be used in conjunction with the present invention. Because these techniques are so well known, they will not be described in detail.

If recovery from a problem with the physical layer is detected, then in step S94, the MPE 302 is notified of the PHY 310 associated with the recovery. The MPE 302 notifies the ML-LB 308 to add the PHY 310 to the active link set in step S96, and in step S98, the ML-LB 308 adds the PHY 310 to the active link set. Accordingly, the ML-LB 308 will schedule packets for transmission over the T1/E1 line associated with the recovered PHY 310.

Figure 10:
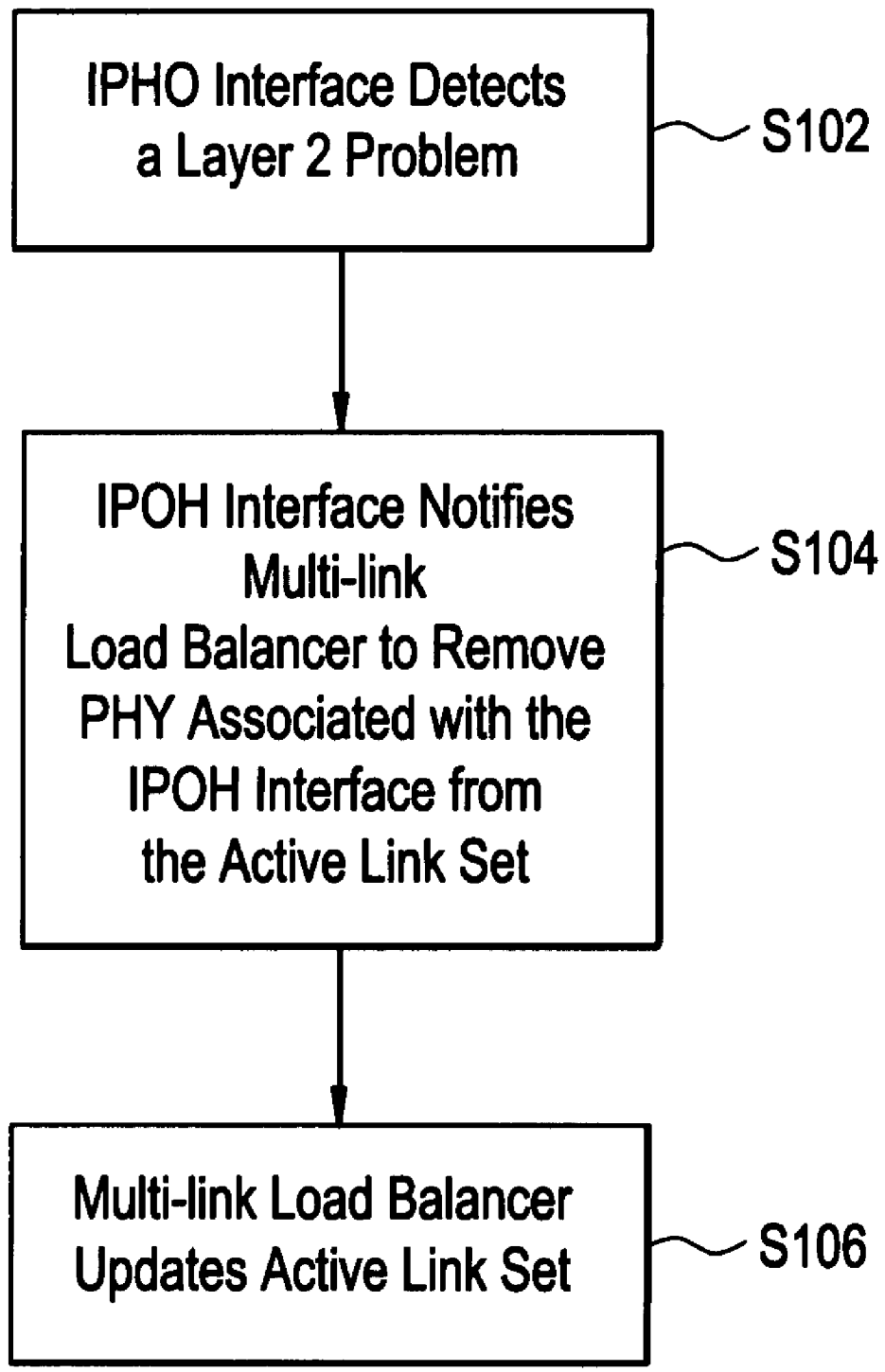
FIG. 10 illustrates a flow chart of a method for managing layer 2 problems in the BTS of FIG. 3.

FIG. 10 illustrates a flow chart of a method for managing layer 2 problems. As shown, in step S102, an IPOH interface 306 detects a layer 2 problem. Many different well-known techniques exist for detecting layer 2 errors, and any of these techniques may be used in conjunction with the present invention. For example, the well-known serial link address resolution protocol (SLARP) may be used. Because these techniques are so well known, they will not be described in detail.

If a problem with layer 2 is detected, then in step S104, the IPOH interface 306 notifies the ML-LB 308 to remove the PHY 310, associated with the IPOH interface 306, from the active link set. The ML-LB 308 removes the PHY 310 from the active link set in step S106. Accordingly, the ML-LB 308 will no longer schedule packets for transmission over the T1/E1 line associated with the removed PHY 310.

FIG. 11 illustrates a flow chart of a method for managing recovery from layer 2 problems. As shown, in step S112, an IPOH interface 306 detects recovery from a layer 2 problem. Many different well-known techniques exist for detecting recovery from layer 2 problems (e.g., SLARP), and any of these techniques may be used in conjunction with the present invention. Because these techniques are so well known, they will not be described in detail.

If recovery from a problem with the layer is detected, then in step S114, the IPOH interface 306 detecting recovery notifies the ML-LB 308 to add the PHY 310, associated with the IPOH interface 306, to the active link set. The ML-LB 308 adds the PHY 310 to the active link set in step S116. Accordingly, the ML-LB 308 will schedule packets for transmission over the T1/E1 line associated with the recovered PHY 310.

As will be understood from the above description of FIGS. 7-11, removing and adding PHYs 310 to the active link set does not require a change in the default path or primary IPOH interface 306.

The invention being thus described, it will be obvious that the same may be varied in many ways. For example, while embodiments of the present invention were described with respect to an EVDO system, it will be appreciated that the present invention is not limited to this system. Such variations are not to be regarded as a departure from the invention, and all such modifications are intended to be included within the scope of the invention.

We claim:

1. A method of configuring a base station entity to load balance a backhaul on a reverse link, comprising:
   configuring a load balancer in the base station entity, the load balancer being configured to include a number of queues and a link scheduler, the link scheduler configured to drain packets from the queues and output the drained packets to a plurality of physical channel interfaces, each of the plurality of physical channel interfaces interfacing with a respective channel of the backhaul; and
   configuring at least one packet control interface in the base station entity to receive packets for transmission over the backhaul and for storing the received packets in one of the queues of the load balancer, wherein the packets include user traffic packets and interface packets, each of the user traffic packets has a priority class and each of the interface packets being one of a control, management and signaling packet for a particular channel of the backhaul, and the load balancer is configured to include a traffic queue for each of a plurality of priority classes and an interface queue for each of the plurality of physical channel interfaces.

2. The method of claim 1, wherein the packets include user traffic packets and interface packets, each of the interface packets being one of a control, management and signaling packet for a particular channel of the backhaul.

3. The method of claim 2, wherein the configuring at least one packet control interface step configures a packet control interface for each active physical channel interface.

4. The method of claim 3, further comprising:
configuring a packet stack to distribute packets to the packet control interfaces such that the packet stack distributes the user traffic packets to only one of the packet control interfaces.

5. The method of claim 4, wherein the configuring a packet stack step configures the packet stack to send interface packets to the packet control interface associated with the physical channel interface interfacing with the physical channel to which the interface packet is destined.

6. The method of claim 4, wherein the configuring at least one packet control interface step configures the packet control interface, which distributes the user traffic packets, to distribute each user traffic packet based on a quality of service level for the user traffic packet.

7. The method of claim 6, wherein the configuring a load balancer step configures the load balancer to include a traffic queue for each possible priority class into which the quality of service levels are divided, and to include an interface queue for each of the plurality of physical channel interfaces.

8. The method of claim 1, wherein
the packets include interface packets, each of the interface packets being one of a control, management and signaling packet for a particular channel of the backhaul; and
the configuring a load balancer step configures the load balancer to include an interface queue for each of the plurality of physical channel interfaces.

9. The method of claim 1, wherein the configuring a load balancer step configures the load balancer such that the link scheduler is configured to drain the queue based on a defined method.

10. The method of claim 9, wherein the defined method is weighted round robin.

11. The method of claim 1, wherein the configuring a load balancer step configures the load balancer such that the link scheduler is configured to send each of the drained user traffic packets to the physical channel interface associated with a least loaded channel of the backhaul.

12. A method of load balancing transmission from a base station entity over a backhaul on a reverse link, comprising:
distributing user traffic packets to a plurality of queues, each of the user traffic packets has a priority class, the plurality of queues include a traffic queue for each of a plurality of the priority classes;
distributing interface packets to a plurality of interface queues, each of the interface packets being one of a control, management and signaling packet for a particular channel of the backhaul, and each of the plurality of interface queues being associated with a respective one of a physical channel interfaces;
draining the queues of the user traffic packets according to a defined methodology; and
sending the drained user traffic packets to the plurality of physical channel interfaces, each of the plurality of physical channel interfaces interfacing with a respective channel of the backhaul, and the sending step sending each of the drained user traffic packets to the physical channel interface associated with a least loaded channel of the backhaul.

13. The method of claim 12, wherein the distributing step distributes the user traffic packets based on a quality of service for each of the user traffic packets.

14. The method of claim 13, wherein, for each of the user traffic packets, the distributing step comprises:
examining a quality of service identifier in the user traffic packet;
accessing a queue in the plurality of queues from a map based on the examined quality of service identifier; and
sending the user traffic packet to the accessed queue.

15. The method of claim 12, wherein the defined methodology is weighted round robin.

16. The method of claim 12, further comprising:
maintaining a list of active physical channel interfaces; and
wherein the sending step sends the drained packets user packets to the physical channel interfaces on the list.

17. The method of claim 16, further comprising:
removing a physical channel interface from the list if a problem associated with the physical channel interface is detected.

18. The method of claim 17, further comprising:
adding the physical channel interface back to the list if recovery from the problem is detected.

* * * * *